US009880841B2

(12) United States Patent
Ike

(10) Patent No.: US 9,880,841 B2
(45) Date of Patent: Jan. 30, 2018

(54) COMPUTATION METHOD FOR COMPUTING PERFORMANCE VALUE WHEN PROCESSOR EXECUTES CODE, COMPUTATION APPARATUS FOR COMPUTING PERFORMANCE VALUE WHEN PROCESSOR EXECUTES CODE, AND COMPUTER READABLE STORAGE MEDIUM STORING COMPUTATION PROGRAM FOR COMPUTING PERFORMANCE VALUE WHEN PROCESSOR EXECUTES CODE

(71) Applicant: FUJITSU LIMITED, Kawasaki-shi, Kanagawa (JP)

(72) Inventor: Atsushi Ike, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 14/534,908

(22) Filed: Nov. 6, 2014

(65) Prior Publication Data
US 2015/0193352 A1    Jul. 9, 2015

(30) Foreign Application Priority Data
Jan. 7, 2014  (JP) .................................. 2014-001176

(51) Int. Cl.
*G06F 9/30*       (2006.01)
*G06F 11/34*      (2006.01)

(52) U.S. Cl.
CPC ...... *G06F 9/30043* (2013.01); *G06F 11/3419* (2013.01); *G06F 11/3461* (2013.01); *G06F 2201/885* (2013.01)

(58) Field of Classification Search
CPC ............. G06F 9/30043; G06F 11/3461; G06F 11/3419; G06F 8/00; G06F 2201/885; G06F 2201/865
See application file for complete search history.

(56) References Cited

U.S. PATENT DOCUMENTS 6,163,840 A * 12/2000 Chrysos ................ G06F 11/348
712/227
2004/0193395 A1* 9/2004 Paulraj ................ G06F 17/5018
703/22
(Continued)

FOREIGN PATENT DOCUMENTS

JP       7-21061       1/1995
JP     2000-122898    4/2000
(Continued)

*Primary Examiner* — Rocio Del Mar Perez-Velez
(74) *Attorney, Agent, or Firm* — Staas & Halsey LLP

(57) ABSTRACT

A computation method includes: obtaining one or more first performance values of one or more instructions in a specific code for each of a plurality of first combinations of behavior result of a cache memory when a plurality of accesses to a memory area are executed; obtaining a second combination of behavior result of the cache memory when the plurality of accesses are executed based on an execution result of behavior simulation of the cache memory for a case where a processor executes a program including the specific code; and computing, by a computer, a third performance value when the processor executes the specific code based on one or more second performance values of the one or more instructions corresponding to the second combination among the one or more first performance values when the second combination is included in the plurality of first combinations.

15 Claims, 15 Drawing Sheets

(56) References Cited

U.S. PATENT DOCUMENTS

| | | | | |
|---|---|---|---|---|
| 2005/0120341 A1* | 6/2005 | Blumenthal | ........ | G06F 11/3428 717/158 |
| 2010/0162216 A1* | 6/2010 | Bell, Jr. | ............. | G06F 11/3457 717/128 |
| 2013/0096903 A1* | 4/2013 | Kuwamura | ............... | G06F 8/52 703/19 |
| 2013/0185021 A1* | 7/2013 | Addison | ............ | G06F 11/3428 702/186 |

FOREIGN PATENT DOCUMENTS

| | | |
|---|---|---|
| JP | 2001-249829 | 9/2001 |
| JP | 2013-84178 | 5/2013 |

\* cited by examiner

FIG. 5

| INSTRUCTION TYPE | SOURCE REGISTER | DESTINATION REGISTER | PENALTY |
|---|---|---|---|
| LD | rs1: e1 | rd: e2 | CACHE MISS: 6 |
| LD | rs1: e1 | rd: e2 | CACHE MISS: 6 |
| MULT | rs1: e1, rs2: e2 | rd: e3 | - |
| .. | .. | .. | .. |

330-1, 330-2, 330-3 — 330

HOST CODE HC

TIMING CODE TC

FIG. 11

```
                                    332 cache_ld (address, inum) {
    cache_miss = cache_lookup(address);
    if(cache_miss) {
        if(prev_cache_miss_flag == 1 &&
           inum - prev_cache_miss_offset < 5) {
            // ANOTHER CACHE MISS TAKES PLACE AMONG FIVE RECENT INSTRUCTIONS
            for(i = prev_cache_miss_offset; i < inum+5; i++) {
                    // EXECUTE SIMULATION AGAIN FOR EVERY (AT MOST) FIVE
PRECEDING AND SUCCEEDING INSTRUCTIONS AND ADD A DIFFERENCE TO current_time
            }
        } else {
            // ADD LATENCY CORRECTION FOR A CACHE MISS CASE
            current_time += delta_miss[inum];
        }
        prev_cache_miss_flag = 1;
        prev_cache_miss_offset = inum;
    }
}
```

COMPUTATION METHOD FOR COMPUTING PERFORMANCE VALUE WHEN PROCESSOR EXECUTES CODE, COMPUTATION APPARATUS FOR COMPUTING PERFORMANCE VALUE WHEN PROCESSOR EXECUTES CODE, AND COMPUTER READABLE STORAGE MEDIUM STORING COMPUTATION PROGRAM FOR COMPUTING PERFORMANCE VALUE WHEN PROCESSOR EXECUTES CODE

CROSS-REFERENCE TO RELATED APPLICATION

This application is based upon and claims the benefit of priority of the prior Japanese Patent Application No. 2014-001176, filed on Jan. 7, 2014, the entire contents of which are incorporated herein by reference.

FIELD

The embodiments discussed herein are related to a computation method, computation apparatus, and storage medium.

BACKGROUND

Various technologies to support program development exist.

Japanese Laid-open Patent Publications No. 2000-122898, No. 2001-249829, No. 7-21061, and No. 2013-84178 discuss related arts.

SUMMARY

According to an aspect of the embodiments, a computation method includes: obtaining one or more first performance values of one or more instructions in a specific code for each of a plurality of first combinations of behavior result of a cache memory when a plurality of accesses to a memory area are executed; obtaining a second combination of behavior result of the cache memory when the plurality of accesses are executed based on an execution result of behavior simulation of the cache memory for a case where a processor executes a program including the specific code; and computing, by a computer, a third performance value when the processor executes the specific code based on one or more second performance values of the one or more instructions corresponding to the second combination among the one or more first performance values when the second combination is included in the plurality of first combinations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of timing information;

FIG. 11 illustrates an example of a helper function cache_Id;

DESCRIPTION OF EMBODIMENT

For example, in order to support program development, a performance value such as an execution time of a program when the program is run on a processor is estimated. For example, behavior of a multi-tiered cache memory is simulated.

For example, a program is divided into a plurality of blocks, and a static execution cycle count with a pipeline interlock taken into consideration is computed in each block.

For example, for each block, when the processor executes a memory access instruction such as a load instruction and a store instruction, the performance value varies depending on a behavior result of the cache memory. Through behavior simulation of the cache memory for each block by using a prearranged performance value of each instruction in the block for a cache hit case, a performance value of the block is computed. For a cache miss case, the behavior simulation of the processor for the cache miss case is carried out, and the performance value of the block is computed.

For example, when a plurality of memory access instructions are included in a block, probability that all behavior results of the cache memory for the plurality of memory access instructions are cache hits may be low. Therefore, because a prearranged performance value of each instruction for a case of all cache hits is not used if a cache miss takes place for any of access instructions, computation of the performance value of the block may not be carried out efficiently.

Figure 1:
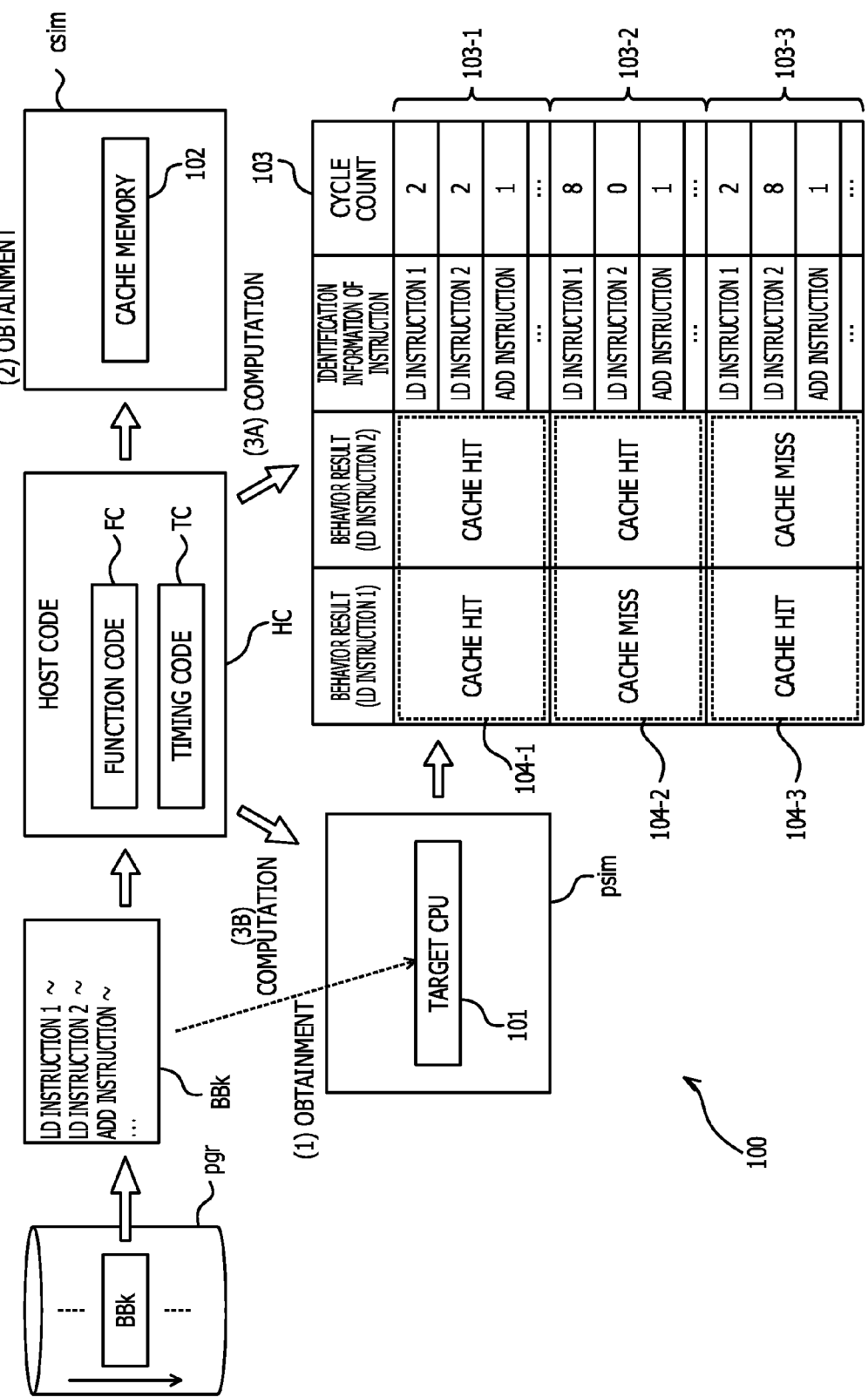
FIG. 1 illustrates an example of an operation of a computation apparatus.

FIG. 1 illustrates an example of an operation of a computation apparatus. A computation apparatus 100 may be a computer that computes a performance value of a target program pgr when a first processor executes the target program pgr. The performance value may include, for example, an execution time, cycle count, or the like, which are taken for the target program pgr to be executed. The computation apparatus 100 includes a second processor. The first processor and the second processor may be referred to as a target central processing unit (CPU) 101 and a host CPU, respectively.

The target program pgr includes a specific code. The specific code may be a partial code which is obtained by partitioning the target program pgr. The specific code may include a plurality of memory access instructions which instruct the target CPU 101 to access a memory area. The memory area may be, for example, a main memory. Each code such as the specific code obtained by partitioning the target program pgr may be referred to as a block BB. A block BB that is a computation target may be referred to a target block. In FIG. 1, the target block may be a BBk. The block BBk may be a specific code which includes a plurality of memory access instructions instructing the target CPU 101 to access the memory area a plurality of times. For example, the memory access instructions may include a load instruction (hereinafter referred to as "LD (LOAD) instruction"), which reads out data from the main memory or the like, and a store instruction (hereinafter referred to as "ST (STORE) instruction"), which writes data into the main memory or the like. In FIG. 1, the block BBk includes LD instructions 1 and 2, which are executed successively.

When the target CPU 101 executes an LD instruction and ST instruction, for example, the target CPU 101 accesses a cache memory 102 such as a data cache, instruction cache, and translation lookaside buffer (TLB). The cache memory 102 includes a control unit and a memory unit. The control unit has a function to decide whether or not data targeted in an access instructed by a memory access instruction exist on the memory unit. A case in which the data exist on the memory unit is referred to as a cache hit, and, a case in which the data do not exist on the memory unit is referred to as a cache miss hit.

In a case where a plurality of LD instructions are included in a certain range, for example, when a behavior result of the cache memory 102 for the head LD instruction is a cache hit, behavior of the cache memory 102 for a succeeding LD instruction is likely to result in a cache hit. When the behavior result of the cache memory 102 for the head LD instruction is a cache miss hit, for example, the behavior of the cache memory 102 for the succeeding LD instruction is also likely to result in a cache hit. On the other hand, when the behavior result of the cache memory 102 for the head LD instruction is a cache miss hit, there is a low possibility that the behavior of the cache memory 102 for the succeeding LD instruction also results in a cache miss hit. For example, if the behavior result of the cache memory 102 for the lead LD instruction is a cache miss hit, when the target CPU 101 reads out data targeted in the access by the lead LD instruction from the main memory, nearby data are also read out with the accessed data based on the size of the cache memory 102. Because the target CPU 101 stores the read-out data into the cache memory 102, data targeted in the access by the succeeding LD instruction are likely to be stored in the cache memory 102. Accordingly, there is a low possibility that the behavior of the cache memory 102 for successive LD instructions result in consecutive cache misses. When the first LD instruction and the succeeding LD instruction read out data from different cache memories 102, a head read-out from each cache memory 102 may also result in a cache miss hit. In loop processing, for example, a succeeding read-out is likely to result in a cache hit, and, when the number of loops is large, the possibility of consecutive cache miss hits is also low.

The computation apparatus 100 prepares a cycle count of each instruction in the block BB for each combination of expected behavior results of the cache memory 102 when memory access instructions in the block are executed. The computation apparatus 100, based on cycle counts in accordance with behavior results of the cache memory 102, which are obtained as results of simulation of the cache memory 102 for a case where the block BB is executed, computes a cycle count of the block.

In (1) in FIG. 1, the computation apparatus 100, for each of a plurality of combinations 104, obtains a cycle count of each instruction in the target block when behavior results for the instructions correspond to the combination 104. The combination 104 may be a combination of behavior results of the cache memory 102 when the target CPU 101 executes a plurality of accesses. The plurality of combinations 104 include, for example, a combination which is different from a combination in which all behavior results of the cache memory 102 for the plurality of accesses are cache miss hits. The plurality of combinations 104 include a combination in which all behavior results of the cache memory 102 for the plurality of accesses are cache hits. The plurality of combinations 104 include a combination in which a behavior result of the cache memory 102 for an access among the plurality of accesses is a cache miss hit. In FIG. 1, a cycle count of each instruction in the block BBk is prepared for each of combinations 104-1 to 104-3. In the combination 104-1, the behavior result for the LD instruction 1 is a cache hit, and the behavior result for the LD instruction 2 is a cache hit. In the combination 104-2, the behavior result for the LD instruction 1 is a cache miss hit, and the behavior result for the LD instruction 2 is a cache hit. In the combination 104-3, the behavior result for the LD instruction 1 is a cache hit, and the behavior result for the LD instruction 2 is a cache miss hit.

When the computation apparatus 100 performs for the first time processing to compute cycle counts for the target block, for example, the computation apparatus 100, for each of the plurality of combinations 104, obtains a cycle count of each instruction in the target block when a behavior result corresponds to the combination 104. The cycle count of each instruction for each combination 104 may be included in a table 103 as a record (for example, records 103-1 to 103-3). The table 103 is stored in a storage device which is accessible from the host CPU, such as a random access memory (RAM) and a disk. For example, the computation apparatus 100 obtains a cycle count of each instruction by carrying out behavior simulation psim for each of the plurality of combinations 104. The behavior simulation psim may be simulation of the behavior of the target CPU 101 when the target CPU 101 executes the target block. As a method of the behavior simulation psim, for example, a technology disclosed in Japanese Laid-open Patent Publication No. 2013-84178 may be used.

In (2) in FIG. 1, the computation apparatus 100, based on execution results of behavior simulation csim, obtains a combination 104 of behavior results of the cache memory 102 when the target CPU 101 executes the plurality of accesses. The behavior simulation csim may be simulation of the behavior of the cache memory 102 when the target CPU 101 executes the target program pgr. The behavior simulation csim may be carried out in a simplified manner with, for example, information in which the cache memory 102 is modeled and a target address of an access by each memory access instruction.

The computation apparatus 100 decides whether or not the obtained combination 104 is included in the plurality of combinations 104. In (3A) in FIG. 1, when the obtained combination 104 is included in the plurality of combinations 104, the computation apparatus 100 computes a cycle count of the target block based on cycle counts of instructions corresponding to the obtained combination 104. The cycle count of the target block may be a cycle count of the target block when the target CPU 101 executes the target block.

When the behavior result for the LD instruction 1 is a cache hit and the behavior result for the LD instruction 2 is a cache hit in the obtained combination 104, for example, the computation apparatus 100 computes the cycle count of the target block based on cycle counts of instructions included in the record 103-1. The cycle count of the target block may be, for example, a sum of the cycle counts of the instructions included in the record 103-1.

The computation apparatus 100 decides whether or not the obtained combination 104 is included in the plurality of combinations 104. In (3B) in FIG. 1, when the obtained combination 104 is not included in the plurality of combinations 104, the computation apparatus 100 derives cycle counts of instructions in the target block when behavior results of the instructions correspond to the obtained combination 104 by executing the behavior simulation psim. The computation apparatus 100 computes the cycle count of the target block when the target CPU 101 executes the target block based on the derived cycle counts of the instructions.

In FIG. 1, because the cycle count of the target block is computed based on prepared performance values of individual instructions, an improvement in efficiency in computation of performance values may be achieved. The efficiency in computation of performance values may be indicated by time with respect to accuracy.

In (2), (3A), and (3B) in FIG. 1, the computation apparatus 100 may execute a host code HC which includes a function code FC obtained by compiling the block BB and a timing code TC. In the timing code TC, for example, processing to obtain a combination 104 by the behavior simulation csim and processing to compute the cycle count of the target block for a case of the obtained combination 104 are coded.

The computation apparatus 100 may, for a plurality of accesses, generate a computational code by which a cycle count of the target block when the target CPU 101 executes the target block may be computed based on cycle counts of individual instructions the behavior results of which correspond to a specific combination 104. The specific combination 104 may be, for example, a combination 104 in which all behavior results are cache hits. The computation apparatus 100 may, for each combination 104 other than the specific combination 104 among the plurality of combinations 104, prepare difference values between cycle counts of individual instructions corresponding to the combination 104 and cycle counts of individual instructions corresponding to the specific combination 104. When a combination 104 in the behavior simulation csim is not the specific combination 104, the computation apparatus 100 may correct the cycle count of the target block computed based on the cycle counts of individual instructions corresponding to the specific combination 104 with the difference values. Therefore, all cycle counts of individual instructions may not have to be stored in a storage device such as a RAM and a disk. Memory saving may be achieved.

Even when a plurality of memory access instructions are included in the target block, if interspaces between the plurality of memory access instructions surpass a certain distance, different behavior simulations may be carried out.

Figure 2:
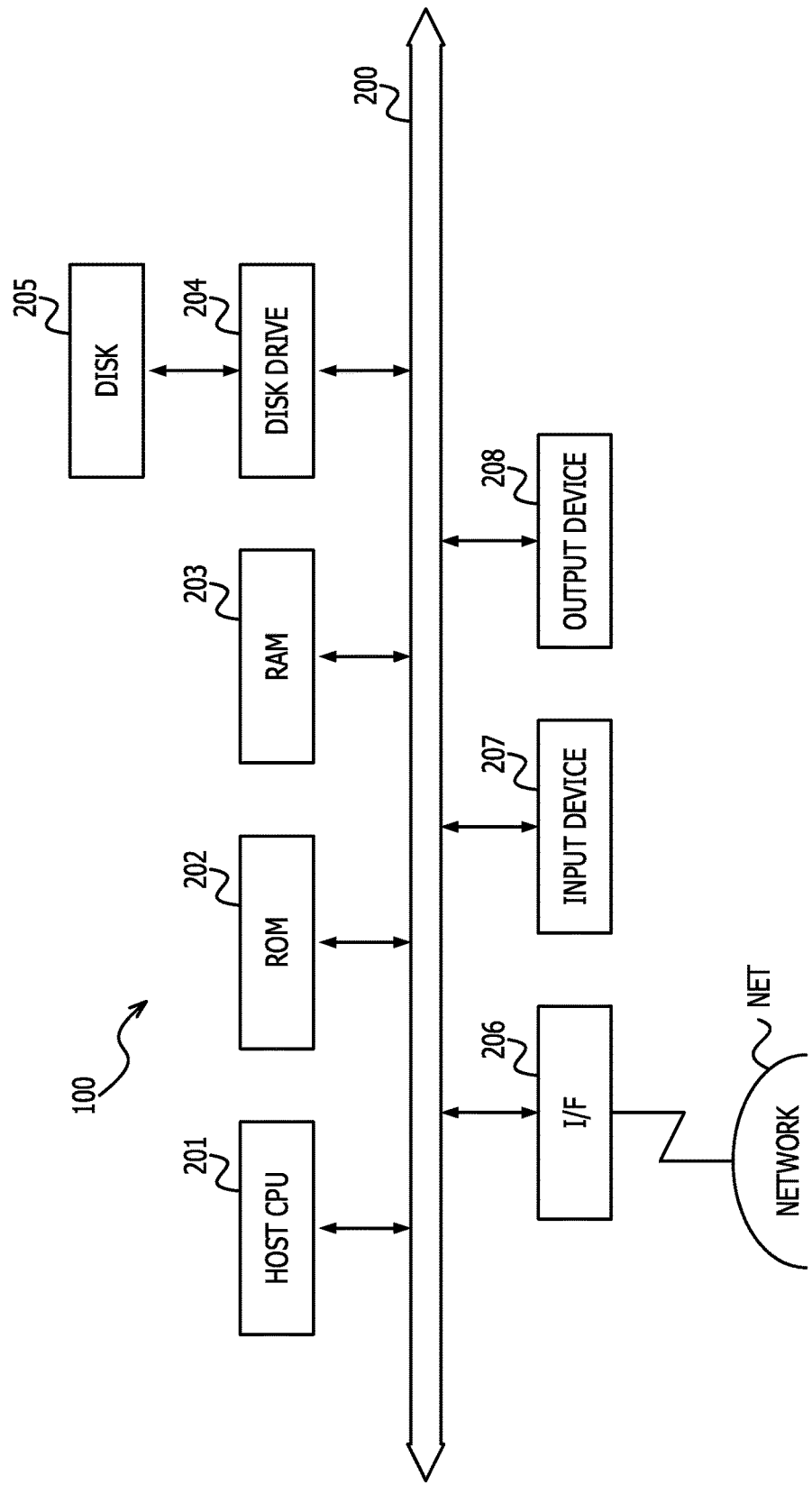
FIG. 2 illustrates an example of a hardware configuration of a computation apparatus.

FIG. 2 illustrates an example of a hardware configuration of a computation apparatus. In FIG. 2, the computation apparatus 100 includes a host CPU 201, a read only memory (ROM) 202, a RAM 203, a disk drive 204, and a disk 205. The computation apparatus 100 includes an interface (I/F) 206, an input device 207, and an output device 208. All the components are interconnected by a bus 200.

The host CPU 201 may control the whole computation apparatus 100. The host CPU 201 is a host CPU that carries out a performance simulation of the target CPU 101. The ROM 202 stores a target program pgr such as a boot target program pgr. The RAM 203 is a memory unit that is used as a work area for the host CPU 201. The disk drive 204 controls a read/write operation from/to the disk 205 in accordance with control by the host CPU 201. The disk 205 stores data written under the control of the disk drive 204. The disk 205 may include a magnetic disk, an optical disk, or the like.

The I/F 206 is coupled to a network NET such as a local area network (LAN), a wide area network (WAN), and the Internet via a communication line, and coupled to another computer via the network NET. The I/F 206 controls data input and output from another computer by internally interfacing with the network NET. As the I/F 206, for example, a modem or a LAN adaptor may be employed.

The input device 207 may be an interface which inputs various data through operation input by a user using a keyboard, mouse, touch panel, or the like. The output device 208 may be an interface which outputs data based on commands by the host CPU 201. The output device 208 may include a display, printer, or the like.

Figure 3:
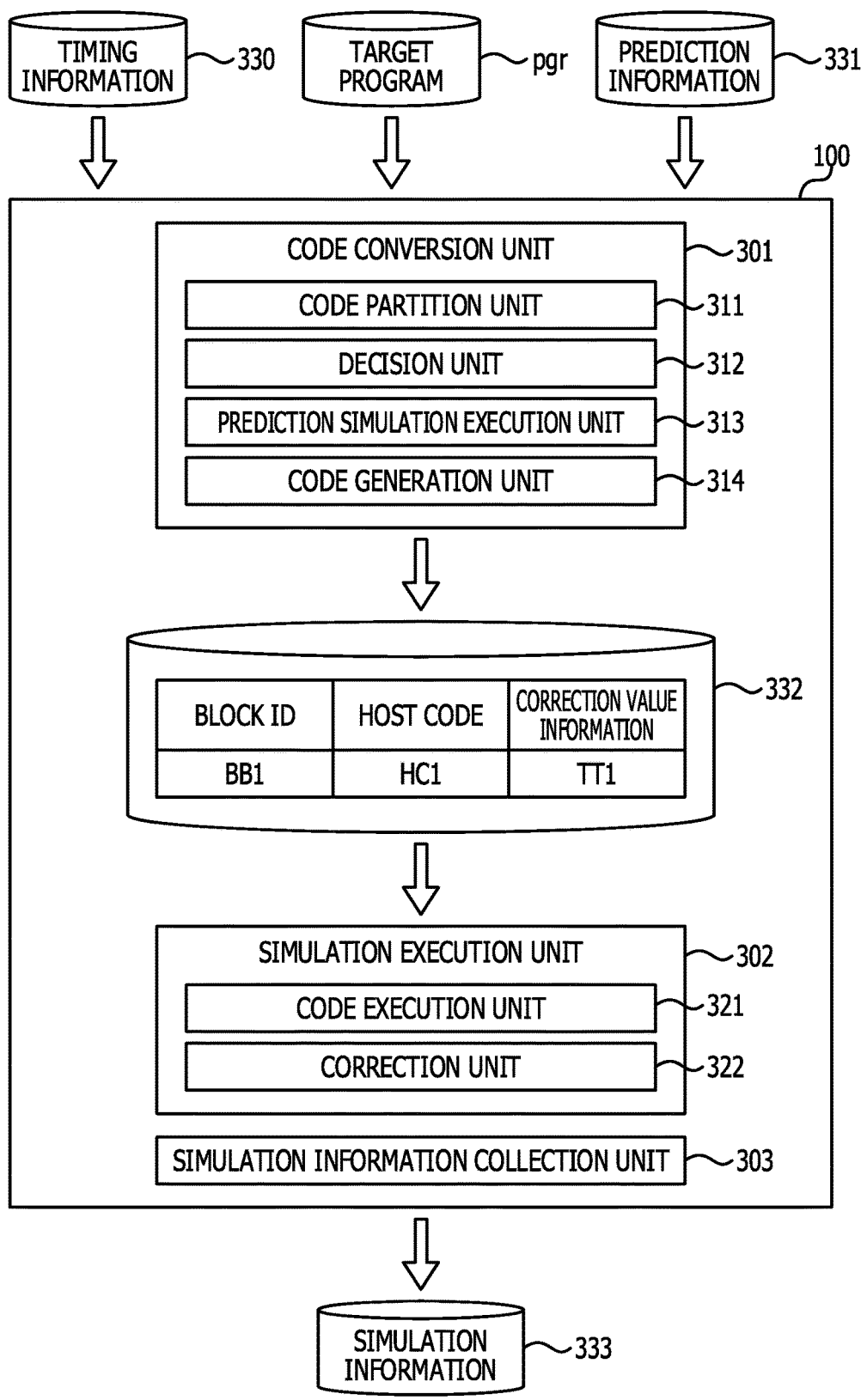
FIG. 3 illustrates an example of a functional configuration of a computation apparatus.

FIG. 3 illustrates an example of a functional configuration of a computation apparatus. The computation apparatus 100 includes a code conversion unit 301, a simulation execution unit 302, and a simulation information collection unit 303. The code conversion unit 301, simulation execution unit 302, and simulation information collection unit 303 may correspond to the control unit. Processing of each component may, for example, be coded in a computation target program pgr, which is stored in a storage device accessible for the host CPU 201, such as the ROM 202, disk 205, or the like. The host CPU 201 reads out the computation target program pgr from the storage device. The processing of each component may be implemented by the host CPU 201 carrying out the processing coded in the read-out computation target program pgr. Results of the processing of each component may, for example, be stored in a storage device such as the RAM 203 and disk 205.

A target program pgr, timing information on the target program pgr, and prediction information are input to the computation apparatus 100. For example, the target program pgr, timing information 330, and prediction information 331 are input to the computation apparatus 100 through operation input by a user using the input device 207 illustrated in FIG. 2.

The code conversion unit 301 generates a host code HC by which it is possible to compute a performance value when the target block is executed by the target CPU 101 based on performance values of individual instructions in the target block. The performance value may be a cycle count. The simulation execution unit 302 computes a cycle count when the target block is executed by the target CPU 101 by executing the host code HC. The simulation information collection unit 303 outputs information of the cycle count computed by the simulation execution unit 302.

Figure 4:
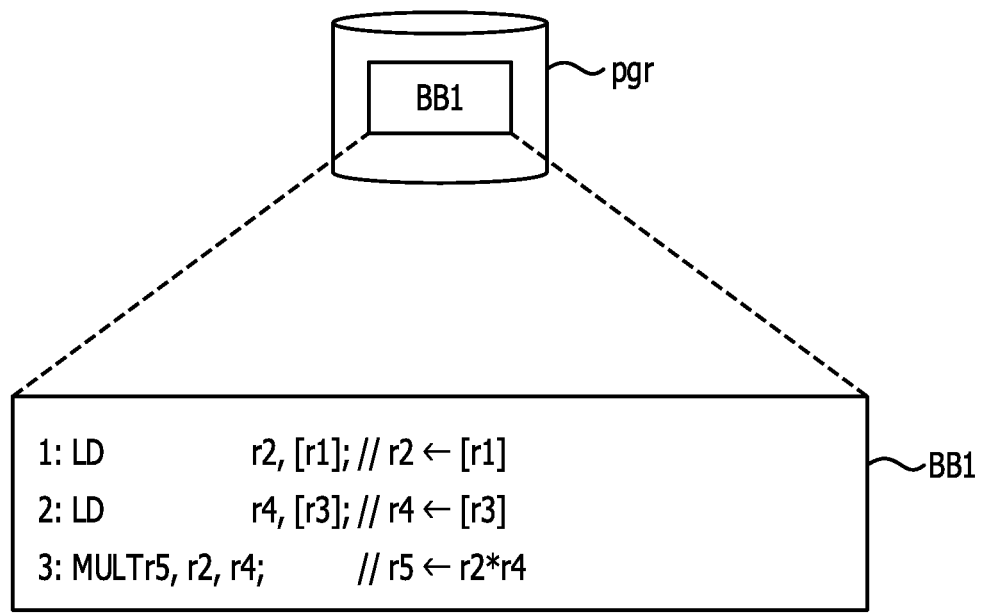
FIG. 4 illustrates an example of a block included in a target program.

FIG. 4 illustrates an example of a block included in a target program. A block BB1 includes consecutive LD instructions and a MULT instruction. The instructions from the LD instruction in the first line to the MULT instruction in the third line are input into a pipeline in the target CPU 101 in this order.

FIG. 5 illustrates an example of timing information. Timing information 330 may include information indicating correspondence between each processing element (stage) and a usable register at the time of instruction execution and information indicating a penalty time (penalty cycle count) which defines a delay time in accordance with an execution result for each externally dependent instruction among instructions.

The externally dependent instruction may be an instruction the cycle count of which changes depending on states of hardware resources the target CPU 101 accesses at the time of instruction execution. Execution of an externally dependent instruction causes execution of, for example, search in the instruction cache, data cache, or TLB, branch prediction processing, stack processing in regard to call/return, and so on. The externally dependent instructions include an LD instruction and an ST instruction. The timing information 330 illustrated in FIG. 5 includes records 330-1 to 330-3.

The timing information 330 includes four fields of an instruction type, source register, destination register, and penalty. To the instruction type field, an operation code of an instruction is stored. To the source register field, the name of a register which is a source of input among operands is stored. To the destination register field, the name of a register which is a destination of output among operands is stored. To the penalty field, a delay time in accordance with an execution result is stored.

The record 330-1 indicates that, for an LD instruction, a source register rs1 (r1) becomes usable at a first processing element (e1, and a destination register rd (r2) becomes usable at a second processing element (e2). The record 330-1 indicates that a cache miss hit causes a delay time of 6 cycles to take place. "ex" indicates an x-th processing element on the execution stage in pipeline stages. "x" may be an integer of 1 or greater.

The record 330-2 indicates that, for another LD instruction, a source register rs1 (r3) becomes usable at a first processing element (e1, and a destination register rd (r4) becomes usable at a second processing element (e2). The record 330-2 indicates that a cache miss hit causes a delay time of 6 cycles to take place.

The record 330-3 indicates that, for a MULT instruction, a first source register rs1 (r2), a second source register rs2 (r4), and a destination register rd (r5) become usable at a first processing element e1, a second processing element e2, and a third processing element e3, respectively.

Figure 6:
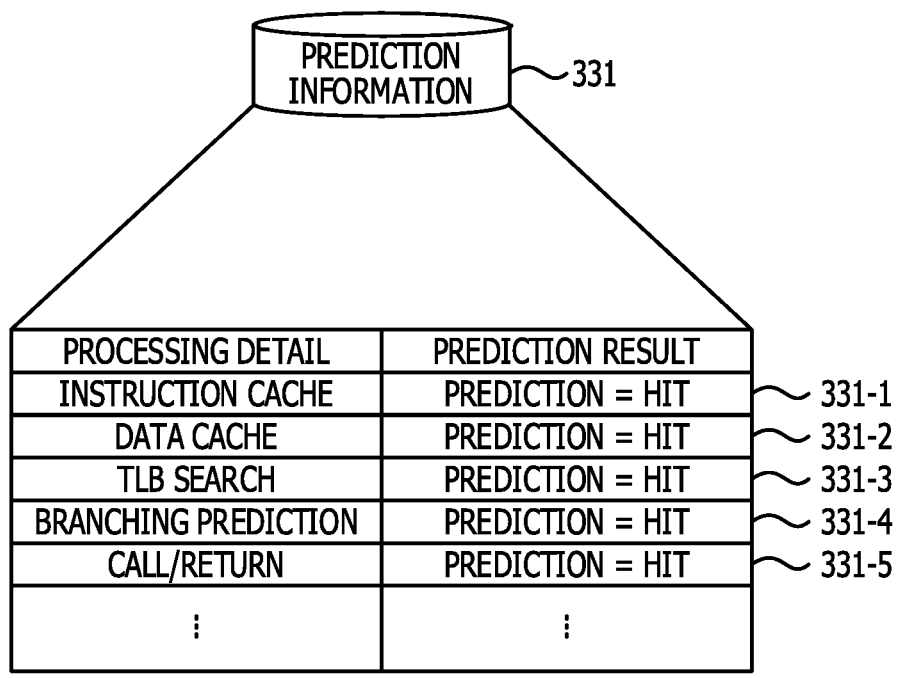
FIG. 6 illustrates an example of prediction information.

FIG. 6 illustrates an example of prediction information. Prediction information 331 may be information that defines execution results with high occurrence probabilities (prediction result) in processing of externally dependent instructions in the target program pgr. For example, the prediction information 331 includes two fields of processing detail and a prediction result. To the processing details field, processing details of externally dependent instructions in the target code are stored. To the prediction result field, prediction results of processing of the externally dependent instructions are stored. The information is stored as records (for example, records 331-1 to 331-5) with each field filled with the information. In the prediction information 331, for example, a prediction for the instruction cache may be a hit, a prediction for the data cache may be a hit, and a prediction for the TLB search may be a hit. In the prediction information 331, for example, a prediction for branching prediction may be a hit, and a prediction for call/return processing may be a hit.

The code partition unit 311, for example, partitions the target program pgr, which is input to the computation apparatus 100, into blocks BB based on a certain criterion. A partitioning timing may be set so that, for example, a new target block is separated when some changes take place to the target block, or the target program pgr may be partitioned into a plurality of blocks BB in advance. A unit of a partitioned block may be, for example, a basic block, or any certain code unit. The basic block unit may be a group of instructions from a branching instruction to an instruction before a next branching instruction.

The decision unit 312 determines whether or not the target block has been compiled. For example, the decision unit 312 decides whether or not the target block becomes a computation target for the first time. If the target block has become a computation target in the past, the target block has already been compiled. If the target block becomes a computation target for the first time, the target block has not been compiled. The decision unit 312 may, for example, determine a block BB that becomes a computation target next in accordance with an execution result of performance simulation. The decision unit 312, for example, decides whether or not a host code HC associated with the target block exists. A host code list 332, for example, includes fields of a block ID, host code, and correction value information. To the block ID field, identification information identifying the block is set. To the host code field, a host code corresponding to the block is set. To the correction value information field, correction value information which is used by the host code HC is set. The decision unit 312 may decides whether or not a host code HC associated with the target block exists by referring to the host code list 332. When a host code HC associated with the target block exists, the decision unit 312 may decide that the target block has been compiled. When no host code HC associated with the target block exists, the decision unit 312 may decide that the target block has not been compiled.

When the decision unit 312 decides that the target block has been compiled, the prediction simulation execution unit 313 sets up a prediction case for each externally dependent instruction included in the target block based on the prediction information 331. The prediction simulation execution unit 313 carries out the behavior simulation psim for execution progress of each instruction in the block BB on the premise of the prediction case by referring to the timing information 330. The prediction simulation execution unit 313 derives a cycle count of each instruction in the block BB on the premise of the set-up prediction case. The prediction simulation execution unit 313 stores the derived cycle count of each instruction into correction value information.

When a plurality of memory access instructions are included in the block BB, the prediction simulation execution unit 313 simulates execution progress of each instruction in the block BB on the premise of a case different from the prediction case by referring to the timing information 330. The prediction simulation execution unit 313 derives a cycle count of each instruction in the block BB on the premise of a case different from the set-up prediction case.

The prediction simulation execution unit 313 outputs a difference value between the cycle count of the block BB computed on the premise of the set-up prediction case and the cycle count of the block BB computed on the premise of a case different from the set-up prediction case. The destination of the output may be, for example, the correction value information.

Figure 7A:
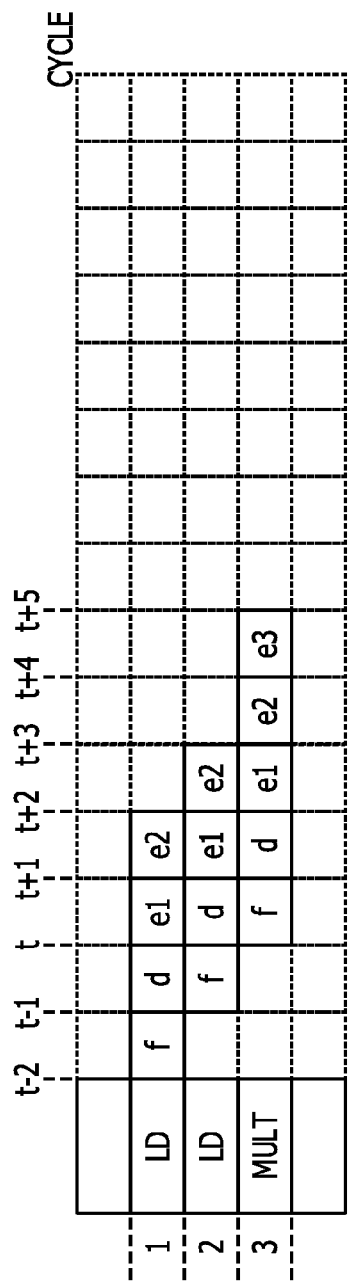
FIG. 7A illustrates an example of a case in which all results are cache hits.
Figure 7B:
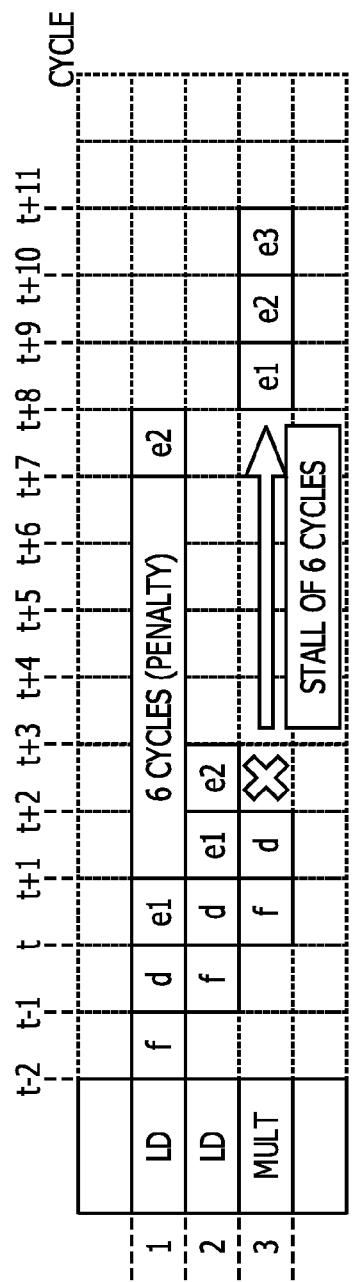
FIG. 7B illustrates an example of behavior when a result for a head LD instruction is a cache miss.

FIG. 7A illustrates an example of a case in which all behavior results are cache hits. FIG. 7B illustrates an example of behavior when the behavior result for a head first LD instruction is a cache miss hit. An f-stage, d-stage, and e-stage of each instruction in the block BB1 are executed in order. The executions of the f-stage and d-stage are carried out in a cycle regardless of an instruction, and the execution of the e-stage is carried out in different cycle counts with respect to each instruction. For an LD instruction and ST instruction, reference cycle counts may be set to 2. For a MULT instruction, a reference cycle count may be set to 3. For other instructions such as an ADD instruction and SUB instruction, reference cycle counts may be set to 1. The reference cycle counts may be set in accordance with a configuration of the target CPU 101 and may also be changed.

With reference to the timing information 330 illustrated in FIG. 5, the f-stage of the LD instruction in the first line is executed at a timing t–2, and the f-stage of the LD instruction in the second line is executed at a timing t–1. The f-stage of the MULT instruction in the third line is executed at a timing t.

In FIG. 7A, a result of the behavior simulation for a combination for which both behavior results of the cache memory 102 for the LD instructions in the first line and the second line are cache hits is illustrated. In FIG. 7A, the e3-stage of the MULT instruction in the third line is executed at a timing t+4. For example, a difference value x between the execution timing of the f-stage of the LD instruction in the first line and the execution timing of the e3-stage of the MULT instruction in the third line may be 6.

In FIG. 7B, a result of the behavior simulation for a combination for which a behavior result of the cache memory 102 for the LD instruction in the first line is a cache miss hit and a behavior result of the cache memory 102 for the LD instruction in the second line is a cache hit is illustrated.

In FIG. 7B, the e3-stage of the MULT instruction in the third line is executed at a timing t+10. For example, a difference value y between the f-stage of the LD instruction in the first line and the e3-stage of the MULT instruction in the third line may be 12.

In the prediction simulation execution unit 313, a value corresponding to the difference value y minus the difference value x becomes a correction value in a case where the behavior result of the cache memory 102 when executing the LD instruction in the first line is a cache miss hit. The derived correction value is output to a field of correction value B in the correction value information. For example, the correction value may be 6.

Figure 8:
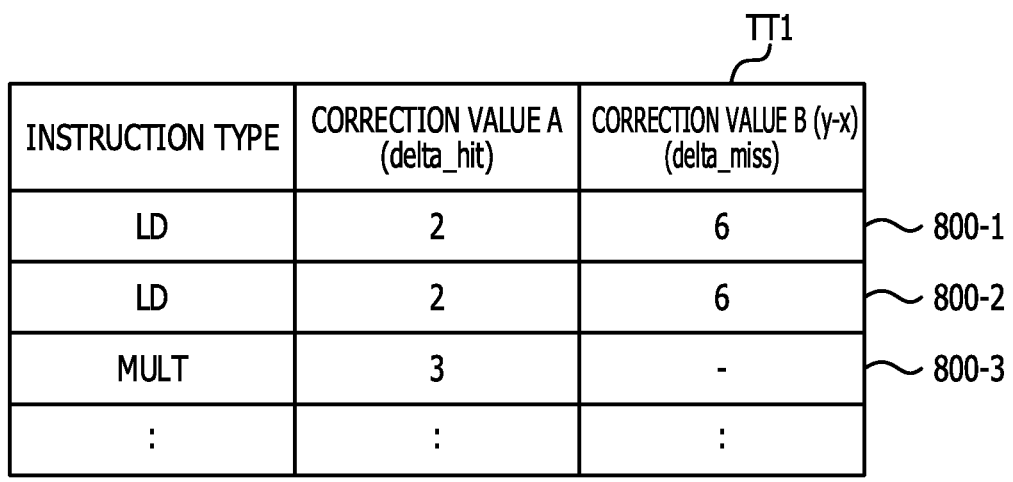
FIG. 8 illustrates an example of correction value information.

FIG. 8 illustrates an example of correction value information. To correction value information TT1, cycle counts which are used in execution of the host code HC1 are set. The correction value information TT1, for example, includes fields of correction value A and correction value B. Information is stored as records (for example, records 800-1 to 800-3) with each field filled with the information. To the field of correction value A, a value which is obtained by correcting the number of e-stages in each instruction based on a result of the behavior simulation on the premise of the prediction case may be set.

As illustrated in FIG. 7A, as to the block BB1, because no stall or the like takes place if the prediction case is set-up on the premise of a cache hit, the number of e-stages in each instruction is set to the field of correction value A without change.

To the field of correction value B, which is a correction value in a case where the behavior result of the cache memory 102 when executing the LD instruction in the first line is a cache miss, which is different from the prediction case, a value of 6, which corresponds to a difference value y minus a difference value x as described above, is set.

A correction value when the behavior result in a case where the cache memory 102 when executing the LD instruction in the second line is a cache miss is computed in substantially the same manner as in the computation of the correction value for the LD instruction in the first line. For example, the correction value may be 6. The probability that, after the behavior result of the LD instruction in the first line results in a cache hit, the behavior result of the LD instruction in the second line results in a cache miss hit may be low. For example, when the behavior result of the cache memory 102 for the LD instruction in the first line is a cache miss hit, the control unit included in the cache memory 102 obtains a certain range of data including the corresponding data from the main memory and stores the obtained data in the cache memory 102. Data to be loaded at execution of the LD instruction in the second line are likely to be included in the certain range of data with a high probability. Therefore, there may be a high probability that the behavior result of the cache memory 102 is a cache hit.

The code generation unit 314, based on results of the prediction simulation, generates a host code HC to compute the cycle count of the target block for a case of the target CPU 101 executing the target block. The generated host code HC, for example, is associated with the target block and stored in a storage device such as a RAM 203 and disk 205. For example, the host code HC is associated with an ID specifying the target block and stored in the host code list 332.

Figure 9A:
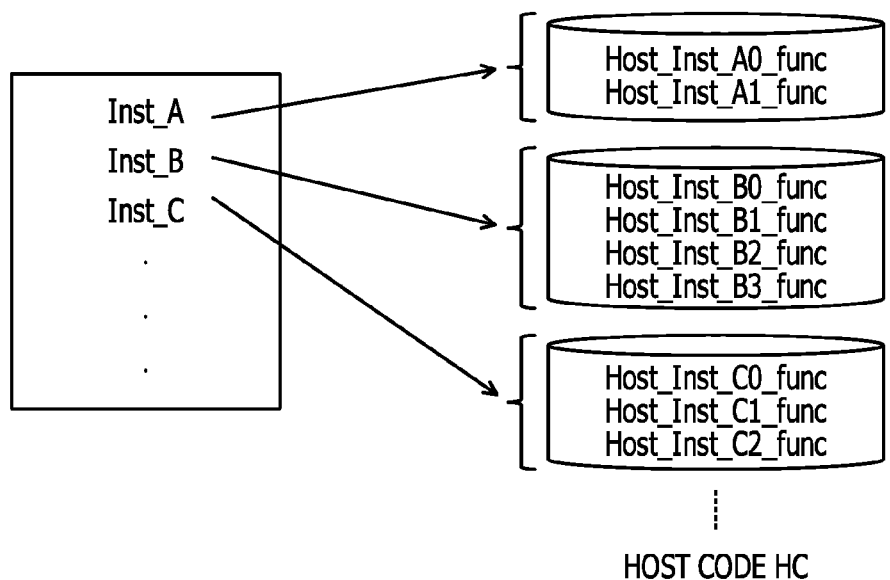
FIGS. 9A and 9B illustrate an example of generation of a host code HC.
Figure 9B:
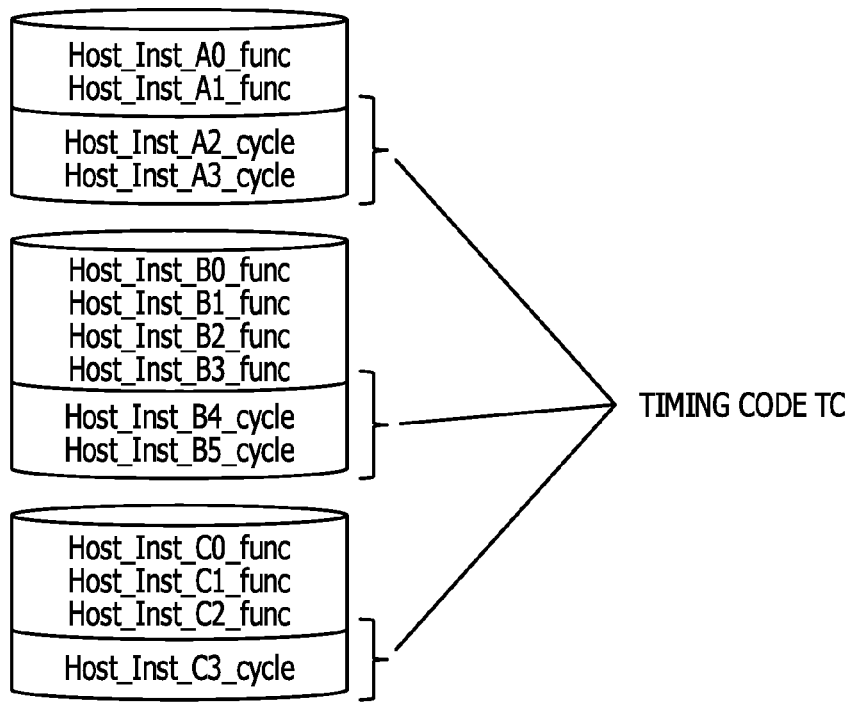

FIGS. 9A and 9B illustrate an example of generation of a host code HC. In FIG. 9A, a host code HC (only function code FC) is generated from the block BB1. In FIG. 9B, to the host code HC (only function code FC), a timing code TC is merged.

As illustrated in FIG. 9A, the code generation unit 314 converts a target code Inst_A included in the block BB1 to host codes Host_Inst_A0_func and Host_Inst_A1_func by compiling a target code Inst_A. The code generation unit 314 converts a target code Inst_B included in the block BB1, by compiling the target code Inst_B, to host codes Host_Inst_B0_func, Host_Inst_B1_func, Host_Inst_B2_func, and Host_Inst_B3_func. The code generation unit 314 converts a target code Inst_C included in the block BB1, by compiling the target code Inst_C, to host codes Host_Inst_C0_func, Host_Inst_C1_func, and Host_Inst_C2_func. As described above, a host code HC including only a function code FC may be generated.

As illustrated in FIG. 9B, the code generation unit 314 adds in, to the host code HC including only a function code FC, timing codes Host_Inst_A2_cycle and Host_Inst_A3_cycle for the target code Inst_A. The code generation unit 314 adds in timing codes Host_Inst_B4_cycle and Host_Inst_B5_cycle for the target code Inst_B. The code generation unit 314 adds in a timing code Host_Inst_C3_cycle for the target code Inst_C.

A timing code TC may be a code to compute the cycle count of the target block by defining cycle counts of instructions included in the target block as constants and summing up the cycle counts of instructions. Information indicating execution progress of the block BB may be obtained. For the function code FC and the timing code TC for instructions other than the externally dependent instructions in the host code HC, known codes may be used. The timing codes TC for the externally dependent instructions are prepared as helper function calling instructions which call correction processing.

Figure 10:
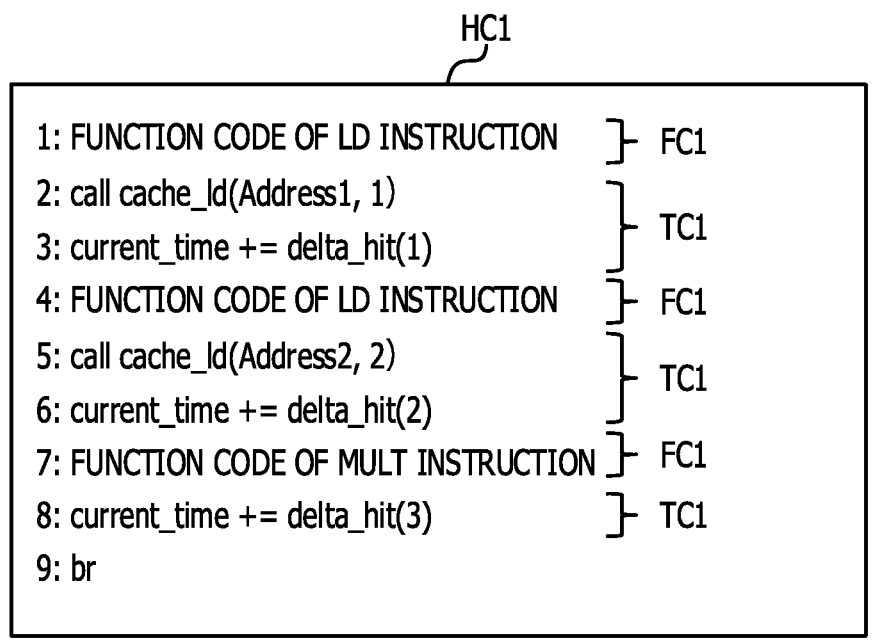
FIG. 10 illustrates an example of a host code HC.

FIG. 10 illustrates an example of a host code HC. A host code HC1 corresponding to the block BB1 includes a function code FC1 and a timing code TC1. The function code FC1 includes a function code for the LD instruction in the first line, a function code for the LD instruction in the second line, and a function code for the MULT instruction in the third line.

The timing code TC1 includes a call instruction calling a helper function cache_Id for the LD instruction in the first line and a computational instruction to add the cycle count of the LD instruction in the first line for the prediction case. The timing code TC1 includes a call instruction calling a helper function cache_Id, a computational instruction to add the cycle count of the LD instruction in the second line for the prediction case, and a computational instruction to add the cycle count of the MULT instruction in the third line.

In FIG. 10, the cycle count of the block BB1 when the target CPU 101 executes the block BB1 is computed by the computational instructions adding cycle counts to "current_time". For example, "delta_hit (1)" to "delta_hit (3)" represent values set in the field of correction value A in the correction value information TT1. "delta_hit (1)" represents the value set in the field of correction value A in the record 800-1. "delta_hit (2)" represents the value set in the field of correction value A in the record 800-2. "delta_hit (3)" represents the value set in the field of correction value A in the record 800-3.

As illustrated in FIG. 10, arguments of the helper function cache_Id include an address of a memory area corresponding to an access destination of the LD instruction and an instruction number. The instruction number may be index information to obtain a value set in the field of correction value B from a record in the correction value information TT1. In "call cache_Id (Address1, 1)" in the second line, for example, the value set in the field of correction value B of the record 800-1 in the correction value information TT1 may be used as a correction value.

The simulation execution unit 302, by executing the host code HC generated by the code generation unit 314, computes cycle counts when the target CPU 101 executes the target block. For example, the simulation execution unit 302 carries out a functional and performance simulation of instruction execution by the target CPU 101, which executes the target program pgr.

For example, the simulation execution unit 302 includes a code execution unit 321 and a correction unit 322. The code execution unit 321 executes the host code HC of the target block. The code execution unit 321, for example, obtains the host code HC corresponding to the ID of the target block from the host code list 332 and executes the obtained host code HC.

When the host code HC of the target block is executed, the simulation execution unit 302 identifies a block BB that becomes the processing target next. Hence, the simulation execution unit 302 changes the value of a program counter (PC) in the behavior simulation psim in such a way that the value points an address where the block BB is stored. Alternatively, the simulation execution unit 302, for example, outputs information of the block BB becoming the processing target next (for example, block BB ID) to the code conversion unit 301. Therefore, the code conversion unit 301 recognizes that the target block in the behavior simulation psim for execution of the host code HC has been changed, and also recognizes the next target block in the behavior simulation psim.

In execution of the host code HC, the code execution unit 321, by executing a helper function cache_Id calling instruction, calls the correction unit 322, which is a helper function cache_Id. When an execution result of an externally dependent instruction is different from the set prediction case, the correction unit 322 computes a cycle count of the externally dependent instruction by correcting the cycle count in the prediction case.

The correction unit 322, for example, by executing the behavior simulation csim when the target CPU 101 executes the target block, decides whether or not the execution result of the externally dependent instruction is different from the set prediction result. The behavior simulation csim in the correction unit 322, for example, may be executed by feeding the target program pgr to a model of the system including the target CPU 101 and hardware resources such as a cache which is accessible for the target CPU 101. For example, when the externally dependent instruction is an LD instruction, the hardware resource may be the cache memory 102.

For example, when a result for an LD instruction is a cache hit, which is the prediction case, the correction unit 322 ends the process with doing nothing. When the result is different from the prediction case, the correction unit 322 decides whether or not a behavior result in the behavior simulation csim for another LD instruction, which is included in the same block BB and in a certain number of recently executed instructions, is different from the prediction case. The certain number may be, for example, approximately 5 and may be changed by a user or the like.

When the correction unit 322 decides that the result is a cache miss hit, the correction unit 322 executes the behavior simulation csim for a case where a certain number of preceding and succeeding instructions, which include the target LD instruction and are included in the target block, are executed. The correction unit 322, based on the cycle count obtained by the behavior simulation result, adds a difference between the cycle count for a case of a cache hit and the cycle count for a case of a cache miss hit to the cycle count of the target block. The correction unit 322, for example, adds the difference to the above-described "current_time".

FIG. 11 illustrates an example of a helper function cache_Id. The correction unit 322 uses the helper function cache_Id to carry out the behavior simulation csim of the cache memory 102 for a case where the target LD instruction is executed with an argument of address. The behavior simulation csim, for example, is carried out by feeding the address of an access destination by the target LD instruction to a model of the system including the target CPU 101 and a cache which is accessible for the target CPU 101.

The correction unit 322, in a case of a cache miss hit, decides whether or not a case where an LD instruction which is in the same block BB and included in five recently executed instructions is executed in the behavior simulation csim of the cache memory 102 results in a cache miss hit. Whether or not the behavior result of the behavior simulation csim for the LD instruction included in the five recently executed instructions is different from the prediction case may be decided based on "prev_cache_missflag" and "prev_cache_miss_offset". An LD instruction included in five recently executed instructions may be referred to as a recent LD instruction.

When it is decided that the recent LD instruction results in a cache miss hit, the correction unit 322 carries out the behavior simulation psim for the target LD instruction in the target block and five preceding and succeeding instructions around the LD instruction. For example, the correction unit 322, based on a cycle count obtained from the behavior simulation result, adds a difference between the cycle count for a cache hit case and the cycle count for a cache miss hit case to the cycle count of the target block.

When it is decided that a recent LD instruction does not result in a cache miss hit, the correction unit 322 obtains a value set in the field of correction value B of a record 800-inum in the correction value information TT1 and adds the obtained value to "current_time". The addition may be carried out by an add instruction "current_time+=delta_miss[inum]", which adds a correction value B.

When it is decided that the execution of the target LD instruction results in a cache miss hit, the correction unit 322 sets "prev_cache_missflag" to 1 and sets inum to "prev_cache_miss_offset". Therefore, it may be to decide whether or not a recent LD instruction results in a cache miss hit when execution of a next LD instruction results in a cache miss hit.

For example, when it is decided that execution of the LD instruction in the first line results in a cache hit and execution of the LD instruction in the second line results in a cache hit, "current_time" is set to 7 by executing sequential add instructions which are 2+2+3. For example, when it is decided that execution of the LD instruction in the first line results in a cache miss hit and execution of the LD instruction in the second line results in a cache hit, "current_time" is set to 13 by executing sequential add instructions which are 6+2+2+3. For example, when it is decided that execution of the LD instruction in the first line results in a cache hit and execution of the LD instruction in the second line results in a cache miss hit, "current_time" is set to 13 by executing sequential add instructions which are 2+6+2+3.

For example, when it is decided that execution of the LD instruction in the first line results in a cache miss hit and execution of the LD instruction in the second line results in a cache miss hit, the behavior simulation psim is carried out.

Figure 12:
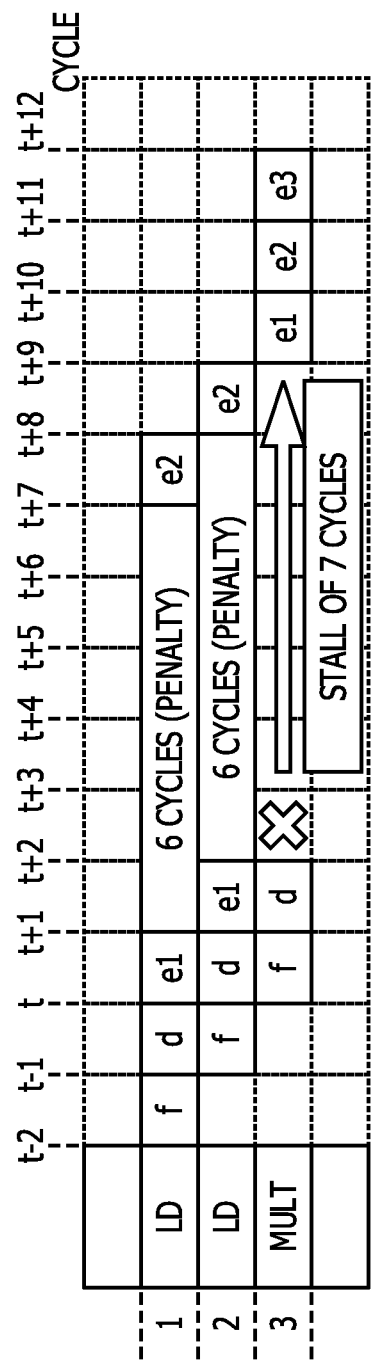
FIG. 12 illustrates an example of behavior in a case where results are consecutively cache misses.

FIG. 12 illustrates an example of behavior when consecutive cache misses result. As illustrated in FIG. 12, the e3-stage of the MULT instruction in the third line is executed at a timing t+11. For example, a difference value z between the f-stage of the LD instruction in the first line and the e3-stage of the MULT instruction in the third line may be 13.

The correction unit 322, by subtracting the difference value x from the difference value z, computes a correction value when behavior results of the cache memory 102 when executing the LD instructions in the first and second lines are both cache miss hits. The difference value x may be, for example, a sum of values set in the field of correction value A in the correction value information TT1 and a value set in the field of correction value B of the record 800-1, which corresponds to the LD instruction in the first line, in the correction value information TT1. For example, the correction value may be 1.

The correction unit 322 adds the computed correction value to "current_time". For example, when it is decided that execution of the LD instruction in the first line results in a cache miss hit and execution of the LD instruction in the second line results in a cache miss hit, "current_time" is set to 14 by executing sequential add instructions which are 6+2+1+2+3.

In this way, the behavior simulation psim may be carried out in advance for a case where all execution results are cache hits and for a case where a cache miss hit takes place for one of instructions, and the behavior simulation psim may be carried out again only when cache miss hits take place consecutively. A speed-up in simulation may be achieved.

When a block BB to be executed next after the target block is identified, the correction unit 322 may carry out the behavior simulation psim for a target LD instruction and five preceding and succeeding instructions around the target LD instruction in the target block and the block BB to be executed next.

The simulation information collection unit 303 outputs simulation information 333, which is information on cycle counts obtained by the simulation execution unit 302.

Figure 13:
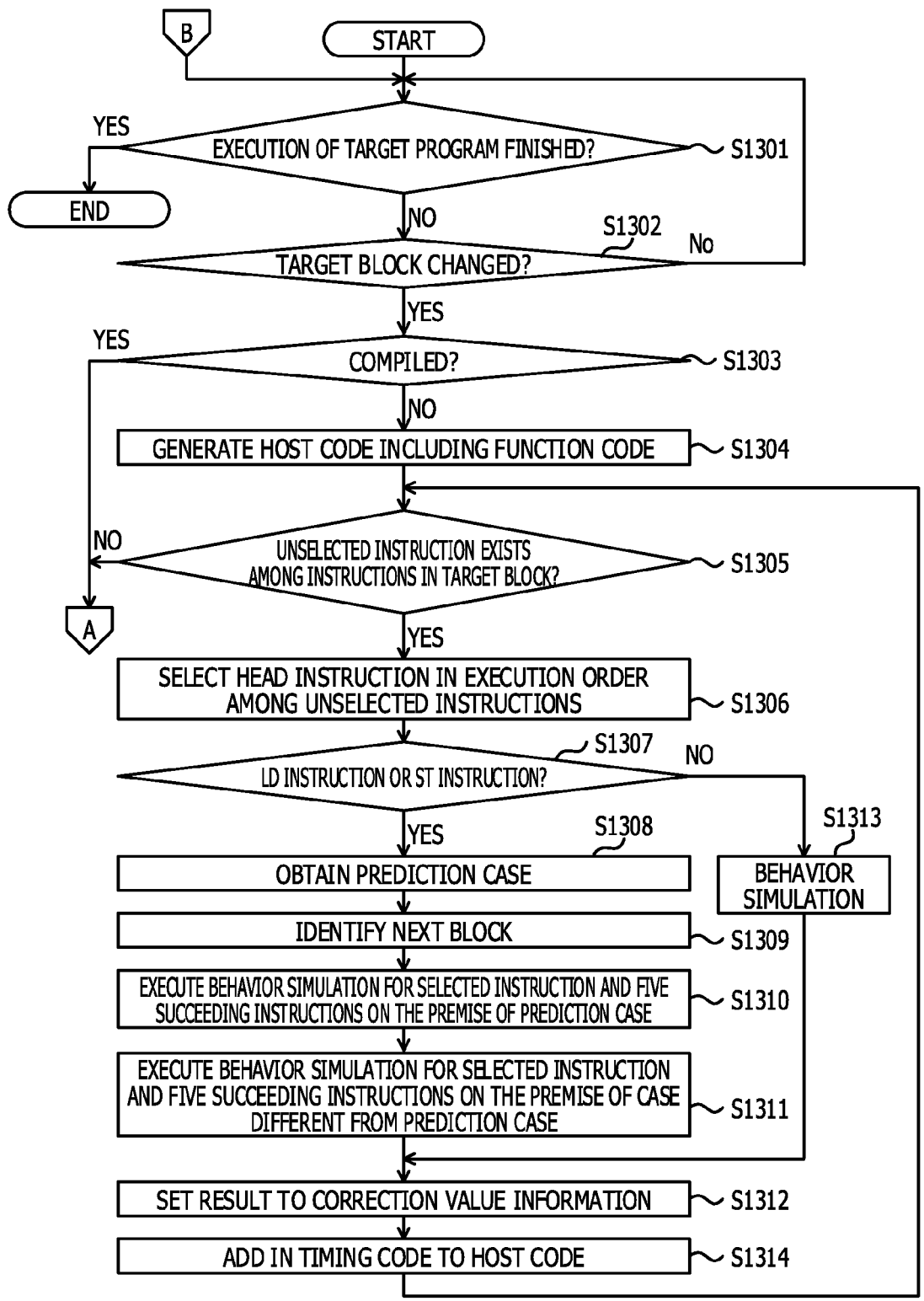
FIG. 13 illustrates an example of a computation processing.
Figure 14:
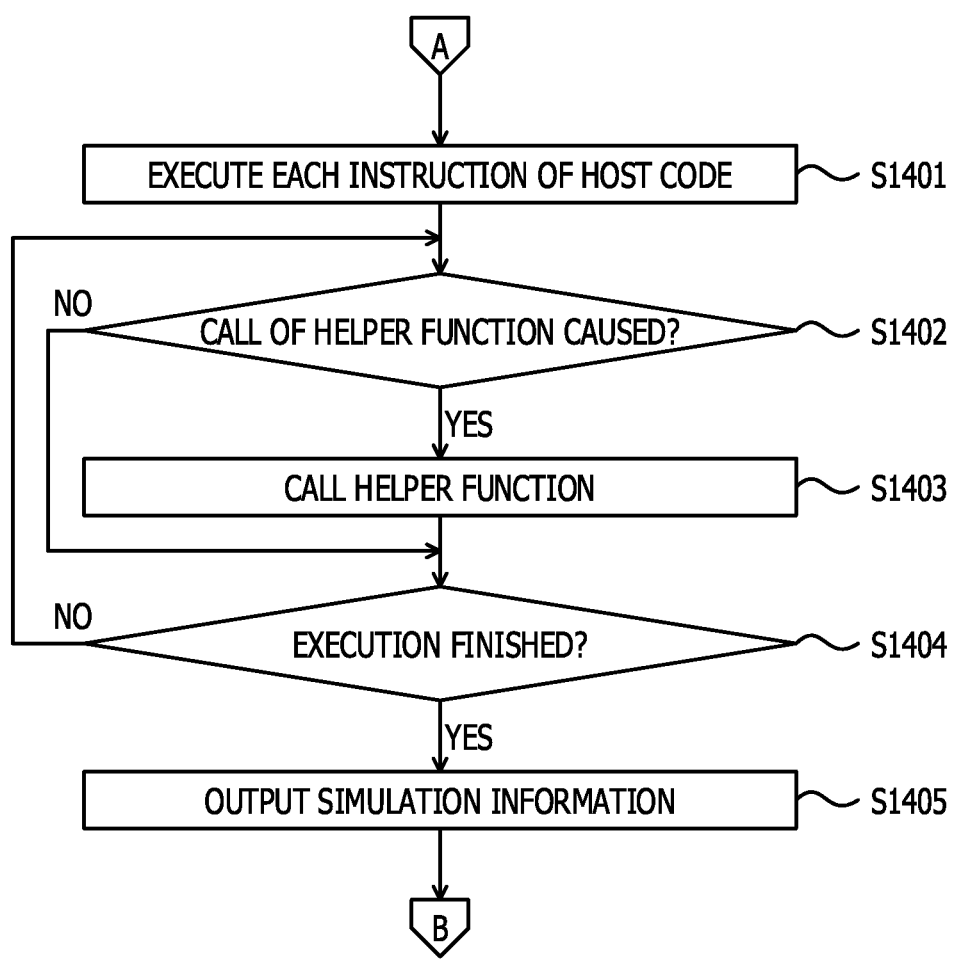
FIG. 14 illustrates an example of a computation processing.

FIGS. 13 and 14 illustrate an example of computation processing. The computation processing illustrated in FIGS. 13 and 14 may be carried out by the computation apparatus 100 illustrated in FIG. 2 or 3. The computation apparatus 100 decides whether or not execution of the target program pgr has been finished (operation S1301). If it is decided that the execution of the target program pgr has not been finished (No in operation S1301), the computation apparatus 100 decides whether or not a target block has been changed (operation S1302). If it is decided that a target block has not been changed (No in operation S1302), the process returns to operation S1301.

If it is decided that a target block has been changed (Yes in operation S1302), the computation apparatus 100 decides whether or not the target block has been compiled (operation S1303).

If it is decided that the target block has not been compiled (No in operation S1303), the computation apparatus 100 generates a host code HC including a function code FC (operation S1304). The computation apparatus 100 decides whether or not an unselected instruction is included among instructions of the target block (operation S1305). If it is decided that an unselected instruction is included (Yes in operation S1305), the computation apparatus 100 selects an instruction at the head position in the execution order among unselected instructions (operation S1306). An instruction the cycle count of which has already been obtained by carrying out the behavior simulation psim with an LD instruction or ST instruction, for example, may not be selected newly.

The computation apparatus 100 decides whether or not the selected instruction is an LD instruction or ST instruction (operation S1307). If it is decided that the selected instruction is an LD instruction or ST instruction (Yes in operation S1307), the computation apparatus 100 obtains a prediction case (operation S1308). The computation apparatus 100 identifies a next block BB (operation S1309). The next block BB may be a block BB that is going to be the computation target right after the current target block. For example, when, although it is not assured that a block BB2 becomes the computation target right after a block BB1, it is apparent, with a probability of 100% or a high probability, that the block BB2 is going to be executed right after the block BB1, the block BB 2 may be identified as the next block BB.

The computation apparatus 100, by carrying out the behavior simulation psim for the selected instruction and five succeeding instructions thereof on the premise of the prediction case, obtains a cycle count of each of the selected instruction and the five succeeding instructions thereof (operation S1310). When a next block BB is not identified and the number of instructions succeeding the selected instruction is less than 5 in the target block, the behavior simulation psim is carried out for the selected instruction and the succeeding instructions the number of which is less than 5.

The computation apparatus 100, by carrying out the behavior simulation psim for the selected instruction and five succeeding instructions thereof on the premise of a case different from the prediction case, obtains a cycle count of each of the selected instruction and the five succeeding instructions (operation S1311). The computation apparatus 100 sets a result to the correction value information TT1 (operation S1312). The process moves to operation S1314.

If it is decided that the selected instruction is neither an LD instruction nor an ST instruction (No in operation S1307), the computation apparatus 100, by carrying out the behavior simulation psim for the selected instruction, obtains a cycle count of the selected instruction (operation S1313). The process moves to operation S1312.

The computation apparatus 100, based on the correction value information TT1, adds a timing code TC to the host code HC (operation S1314). The process returns to operation S1305. If it is decided that there is no unselected instruction in operation S1305 (No in operation S1305), the process moves to operation S1401. If it is decided that the target block has been compiled in operation S1303 (Yes in operation S1303), the process moves to operation S1401.

The computation apparatus 100 executes each instruction in the host code HC (operation S1401). The computation apparatus 100 decides whether or not a call of a helper function cache_Id is caused (operation S1402). If it is decided that no call of a helper function cache_Id is caused (No in operation S1402), the process moves to operation S1404. If it is decided that a call of a helper function cache_Id is caused (Yes in operation S1402), the computation apparatus 100 calls the helper function (operation S1403). The process moves to operation S1404.

The computation apparatus 100 decides whether or not the execution has been finished (operation S1404). If it is decided that the execution has not been finished (No in operation S1404), the process moves to operation S1402. If it is decided that the execution has been finished (Yes in operation S1404), the computation apparatus 100 outputs the simulation information 333 (operation S1405). The process moves to operation S1301.

If it is decided that the execution of the target program pgr has been finished in operation S1301 (Yes in operation S1301), a series of operations ends.

Figure 15:
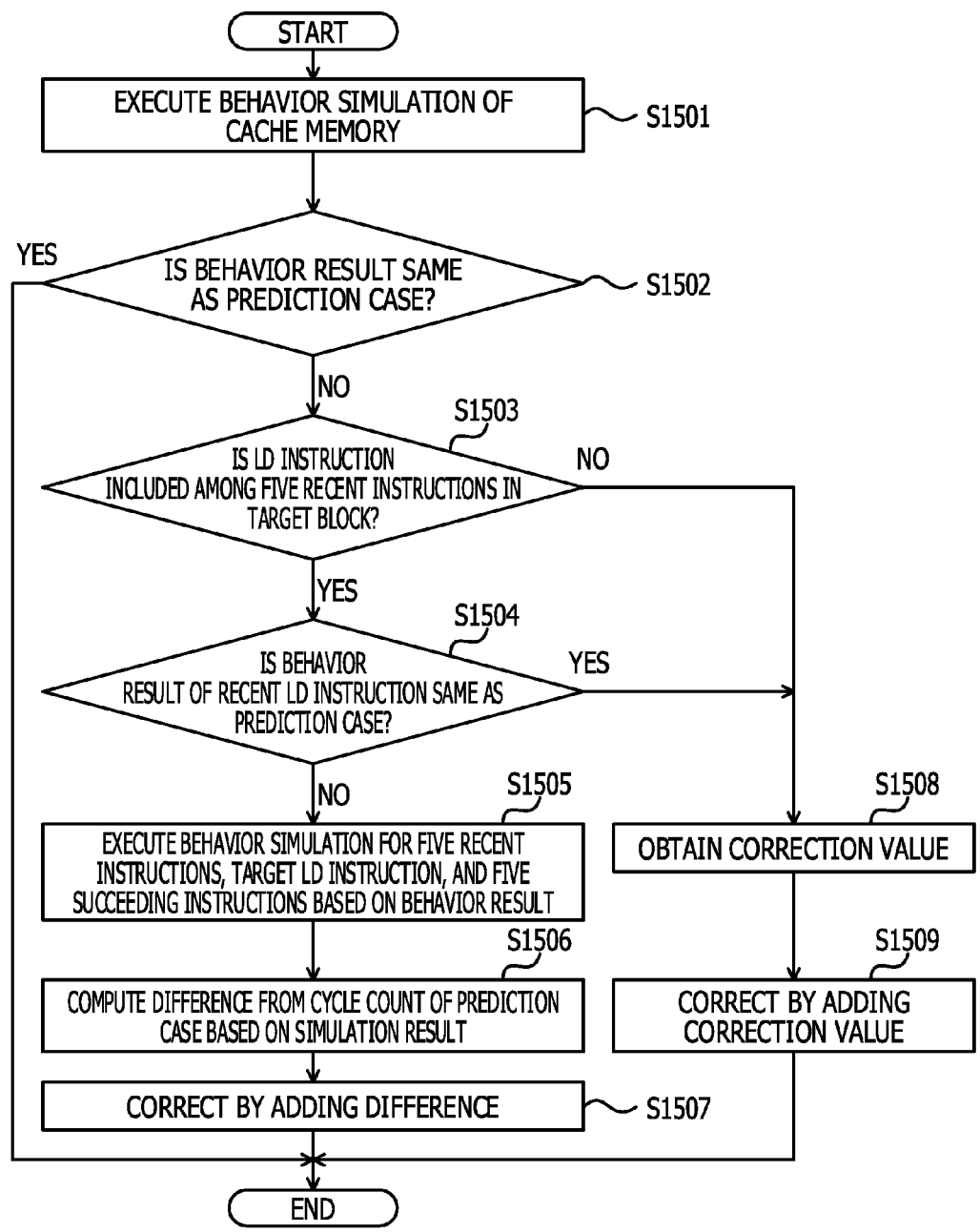
FIG. 15 illustrates an example of a correction processing.

FIG. 15 illustrates an example of correction processing. The correction processing illustrated in FIG. 15 may be carried out by the correction unit 322 illustrated in FIG. 3. The correction unit 322 may correspond to a helper function module. For example, the helper function module may be a helper function as for whether or not a cache access by an LD instruction results in a hit. In FIG. 15, the computation apparatus 100, for a combination 104 in which any one of behavior results of the cache memory 102 for a plurality of accesses is a cache hit, corrects the cycle count of the target block based on the correction value information TT1. The correction may be carried out by using, as a basis, a cycle count of the target block when all behavior results of LD instructions among five most recent instructions are cache hits.

The computation apparatus 100 carries out the behavior simulation csim of the cache memory 102 (operation S1501). As described above, the behavior simulation csim may be a simplified simulation on a system model which models the host CPU and the cache memory 102. The computation apparatus 100 decides whether or not a behavior result of the cache memory 102 in the behavior simulation csim is substantially the same as the prediction case (operation S1502).

If it is decided to be substantially the same (Yes in operation S1502), because the computation apparatus 100 do not have to correct the cycle count of the target block, the series of operations ends. When it is decided not to be substantially the same (No in operation S1502), the computation apparatus 100 decides whether or not an LD instruction is included among five recent instructions in the target block (operation S1503).

If it is decided that no LD instruction is included among five recent instructions in the target block (No in operation S1503), the process moves to operation S1508. When it is decided that an LD instruction is included among five recent instructions in the target block (Yes in operation S1503), the computation apparatus 100 decides whether or not a behavior result of the recent LD instruction is substantially the same as the prediction case (operation S1504). If it is decided that the behavior result of the recent LD instruction is substantially the same as the prediction case (Yes in operation S1504), the computation apparatus 100 obtains a correction value set in the field of correction value B of a record 800 corresponding to the target LD instruction included in the correction value information TT1 (operation S1508). The computation apparatus 100 corrects the cycle count of the target block by adding the correction value (operation S1509). The series of operations ends.

If it is decided that the behavior result of the recent LD instruction is not substantially the same as the prediction case (No in operation S1504), the computation apparatus 100, based on the behavior result, carries out the behavior simulation psim of five recent instructions, the target LD instruction, and five succeeding instructions (operation S1505). The computation apparatus 100, based on simulation results, computes a difference between the resulted cycle count and the cycle count for the prediction case (operation S1506). The computation apparatus 100 adds the computed difference to the cycle count of the target block for correction (operation S1507). The series of operations ends.

The computation apparatus 100, for each of a plurality of combinations of behavior results of the cache memory due to execution of a plurality of memory access instructions in a specific code, prepares a performance value of each instruction in the specific code. The computation apparatus 100, based on performance values corresponding to combinations of behavior results from simulation of the cache memory for a case of execution of each memory access instruction, computes a performance value of the specific code. Accordingly, time to compute performance values is shortened, and an improvement in efficiency in performance computation may be achieved.

When a combination of behavior results of the cache memory simulation is not included in prearranged combinations, the computation apparatus 100, by carrying out behavior simulation of a specific code for the combination of behavior results, computes a performance value of the specific code.

The prearranged combinations may be combinations which are different from a combination in which all behavior results of the cache memory for a plurality of accesses are cache miss hit. Accordingly, time to prearrange a performance value of each instruction corresponding to a combination with the lowest probability of occurrence may be shortened.

The prearranged combinations may include a combination in which all behavior results of the cache memory for a plurality of accesses are cache hits. The prearranged combinations may include a combination in which a behavior result of the cache memory for one access in a plurality of accesses is a cache miss hit. Accordingly, because a performance value of each instruction corresponding to a combination with a high probability of occurrence is prearranged, time to compute a performance value of a specific code may be shortened.

When the computation apparatus 100 becomes a target of computation for the first time, the computation apparatus 100 obtains a performance value of each instruction in the specific code by carrying out behavior simulation of a processor for each of a plurality of combinations. Because the behavior simulation is carried out only when the computation apparatus 100 becomes a target of computation for the first time, the performance value of each instruction may not be obtained repeatedly. Accordingly, through a reduction in the number of behavior simulations, time to compute performance values may be shortened.

The computation apparatus 100, based on a performance value of each instruction corresponding to a combination in which all behavior results for a plurality of accesses are cache hits, generates a host code by which performance values with regard to the specific code may be computed. The computation apparatus 100 corrects the performance value of the specific code for a case of a combination other than the combination of all cache hits. Because a host code for a combination with the highest probability of occurrence is generated, the number of occasions in which correction is not carried out may increase, and time to correction may be shortened. Because the computation apparatus 100 generates a host code only when the computation apparatus 100 becomes a target of computation for the first time, an identical host code may not be generated repeatedly. Accordingly, time to generate a host code may be shortened. Because only one host code is generated for a block, memory saving may be achieved.

When a code to be executed right after the specific code is apparent, the computation apparatus 100 may carry out behavior simulation to compute a performance value of each instruction with including the code to be executed next. A performance value of a target block, which changes in accordance with a combination of behavior results of the cache memory for a memory access instruction in the specific code and a memory access instruction in another code which follows the memory access instruction in the specific code and is going to be executed next, may be estimated. Accordingly, accuracy in estimation of a performance value may be improved.

The above-described computation method may be carried out by executing a prearranged computational program on a computer such as a personal computer and a workstation. The computational program is stored in a computer-readable storage medium such as a magnetic disc, optical disc, and universal serial bus (USB) flash memory, and is read out from the storage medium to be executed by a computer. The computation program may be distributed via a network NET such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computation method comprising:
receiving, by a second processor that computes a performance value of a target program that is executed by a first processor by performing a first behavior simulation and a second behavior simulation, the target program, timing information for the target program including a penalty cycle count corresponding to a delay time in accordance with an execution of an instruction and prediction information for the target program including an execution result of the instruction with high occurrence probability;
partitioning the target program to obtain a plurality of blocks;
deciding whether each of the plurality of blocks is compiled;
compiling, only when deciding that the respective blocks are not compiled, the respective blocks to generate a host code;
performing, only when deciding that the respective blocks are not compiled, a process including:
preparing, as a plurality of first combinations, combinations each of one or more accesses to a memory area and a first access result to a cache memory when the one or more accesses to the memory area are executed to acquire a cycle count in which the first processor executes a code of the target program including the one or more accesses to the memory area; and
obtaining, by performing, based on the host code corresponding to the respective blocks and the timing information, the second behavior simulation that corresponds to an execution of the host code corresponding to the respective blocks by the first processor, one or more first cycle counts of the one or more accesses to the memory area for each of the plurality of first combinations;
obtaining, by performing, based on the host code corresponding to the respective blocks, the first behavior simulation of the cache memory which corresponds to an execution of the target program by the first processor, a second combination of the one or more accesses to the memory area and a second access result to the cache memory in accordance with the execution of the one or more accesses to the memory area in the first behavior simulation;
deciding whether the second access result of the second combination is equal to the first access result of one of the plurality of first combinations;
computing, by the second processor, in a case in which the second access result of the second combination obtained as a result of the first behavior simulation is equal to the first access result of one of the plurality of first combinations, the cycle count based on the one or more first cycle counts;
computing, by the second processor, in a case in which the second access result of the second combination obtained as the result of the first behavior simulation is not equal to the first access result of one of the plurality of first combinations, the cycle count based on one or more second cycle counts obtained by the execution of the second behavior simulation for the one or more accesses to the memory area; and
acquiring the cycle count as the performance value of the target program based on the one or more first cycle counts or the one or more second cycle counts.

2. The computation method according to claim 1, wherein the cycle count is replaced by an execution time that is taken for the execution of the code of the target program by the first processor, the one or more first cycle counts are replaced with one or more first execution times that are taken for the one or more accesses to the memory area, the one or more second cycle counts are replaced with one or more second execution times that are taken for the one or more accesses to the memory area, and the penalty cycle count is replaced with a penalty time.

3. The computation method according to claim 1, wherein the plurality of first combinations include a combination which is different from a combination in which all of the access results to the cache memory in the first access result are cache miss hits.

4. The computation method according to claim 1, wherein the plurality of first combinations include a combination in which all of the access results to the cache memory in the first access result are cache hits and a combination in which one of the access results to the cache memory in the first access result is a cache miss hit.

5. The computation method according to claim 1, wherein the cycle count is computed, in a case in which the second access result of the second combination obtained as the result of the first behavior simulation is equal to the first access result of one of the plurality of first combinations, by a sum of the one or more first cycle counts.

6. The computation method according to claim 1, wherein the one or more accesses to the memory area includes at least one of a load instruction and a store instruction.

7. The computation method according to claim 1, wherein the second behavior simulation is a simplified simulation on a system model that models the first processor and the cache memory.

8. A computation apparatus comprising:
a memory; and
a CPU configured to execute a program stored in the memory to compute a performance value of a target program which is executed by a processor by performing a first behavior simulation and a second behavior simulation,
wherein the CPU performs, based on the program, operation to:
  receive the target program, timing information for the target program including a penalty cycle count corresponding to a delay time in accordance with an execution of an instruction, and prediction information for the target program including an execution result of the instruction with high occurrence probability;
  partition the target program to obtain a plurality of blocks;
  decide whether each of the plurality of blocks is compiled;
  compile, only when it is decided that the respective blocks are not compiled, the respective blocks to generate a host code;
  perform, only when it is decided that the respective blocks are not compiled, a process including:
    prepare, as a plurality of first combinations, combinations each of one or more accesses to a memory area and a first access result to a cache memory when the one or more accesses to the memory area are executed to acquire a cycle count in which the processor executes a code of the target program including the one or more accesses to the memory area; and
    obtain, by performing, based on the host code corresponding to the respective blocks and the timing information, the second behavior simulation which corresponds to an execution of the host code corresponding to the respective blocks by the processor, one or more first cycle counts of the one or more accesses to the memory area for each of the plurality of first combinations;
    obtain, by performing, based on the host code corresponding to the respective blocks, the first behavior simulation of the cache memory which corresponds to an execution of the target program by the processor, a second combination of the one or more accesses to the memory area and a second access result to the cache memory in accordance with the execution of the one or more accesses to the memory area in the first behavior simulation;
    decide whether the second access result of the second combination is equal to the first access result of one of the plurality of first combinations;
    compute, in a case in which the second access result of the second combination obtained as the result of the first behavior simulation is equal to the first access result of one of the plurality of first combinations, the cycle count based on the one or more first cycle counts;
    compute, in a case in which the second access result of the second combination obtained as the result of the first behavior simulation is not equal to the first access result of one of the plurality of first combinations, the cycle count based on one or more second cycle counts obtained by the execution of the second behavior simulation for the one or more accesses to the memory area; and
    acquire the cycle count as a performance value of the target program based on the one or more first cycle counts or the one or more second cycle counts.

9. The computation apparatus according to claim 8, wherein the cycle count is replaced by an execution time that is taken for the execution of the code of the target program by the processor, the one or more first cycle counts are replaced with one or more first execution times that are taken for the one or more accesses to the memory area, the one or more second cycle counts are replaced with one or more second execution times that are taken for the one or more accesses to the memory area, and the penalty cycle count is replaced with a penalty time.

10. The computation apparatus according to claim 8, wherein the plurality of first combinations include a combination which is different from a combination in which all of access results to the cache memory in the first access result are cache miss hits.

11. The computation apparatus according to claim 8, wherein the plurality of first combinations include a combination in which all of the access results to the cache memory in the first access result are cache hits and a combination in which one of the access results to the cache memory in the first access result is a cache miss hit.

12. The computation apparatus according to claim 8, wherein the cycle count is computed, in a case in which the second access result of the second combination obtained as the result of the first behavior simulation is equal to the first access result of one of the plurality of first combinations, by a sum of the one or more first cycle counts.

13. The computation apparatus according to claim 8, wherein the one or more accesses to the memory includes at least one of a load instruction and a store instruction.

14. The computation apparatus according to claim 8, wherein the second behavior simulation is a simplified simulation on a system model which models the processor and the cache memory.

15. A non-transitory computer readable storage medium which stores a computation program to be executed by a computer, the computation program causing the computer to:
- receive, in order to compute a performance value of a target program which is executed by a processor by performing a first behavior simulation and a second behavior simulation, the target program, timing information for the target program including a penalty cycle count corresponding to a delay time in accordance with an execution of an instruction, and prediction information for the target program including an execution result of the instruction with high occurrence probability;
- partition the target program to obtain a plurality of blocks;
- decide whether each of the plurality of blocks is compiled;
- compile, only when it is decided that the respective blocks are not compiled, the respective blocks to generate a host code;
- perform, only when it is decided that the respective blocks are not compiled, a process including:
  - prepare, as a plurality of first combinations, combinations each of one or more accesses to a memory area and a first access result to a cache memory when the one or more accesses to the memory area are executed to acquire a cycle count in which the processor executes a code of the target program including the one or more accesses to the memory area; and
  - obtain, by performing, based on the host code corresponding to the respective blocks and the timing information, the second behavior simulation which corresponds to an execution of the host code corresponding to the respective blocks by the processor, first cycle counts of the one or more accesses area to the memory for each of the plurality of first combinations;
- obtain, by performing, based on the host code corresponding to the respective blocks, the first behavior simulation of the cache memory which corresponds to an execution of the target program by the processor, a second combination of the one or more accesses to the memory area and a second access result to the cache memory in accordance with the execution of the one or more accesses to the memory area in the first behavior simulation;
- decide whether the second access result of the second combination is equal to the first access result of one of the plurality of first combinations;
- compute, in a case in which the second access result of the second combination obtained as a result of the first behavior simulation is equal to the first access result of one of the plurality of first combinations, the cycle count based on the one or more first cycle counts;
- compute, in a case in which the second access result of the second combination obtained as the result of the first behavior simulation is not equal to the first access result of one of the plurality of first combinations, the cycle count based on one or more second cycle counts obtained by the execution of the second behavior simulation for the one or more accesses to the memory area; and
- acquire the cycle count as a performance value of the target program based on the one or more first cycle counts or the one or more second cycle counts.

* * * * *